United States Patent [19]
Glitho

[11] Patent Number: 6,094,660
[45] Date of Patent: *Jul. 25, 2000

[54] CUSTOMER ADMINISTRATIVE SYSTEM MANAGEMENT OF REDUNDANT DATABASE NETWORK ELEMENTS IN A TELECOMMUNICATIONS SYSTEM

[75] Inventor: Roch Glitho, Montreal, Canada

[73] Assignee: Telefonaktiebolaget LM Ericsson, Stockholm, Sweden

[*] Notice: This patent issued on a continued prosecution application filed under 37 CFR 1.53(d), and is subject to the twenty year patent term provisions of 35 U.S.C. 154(a)(2).

[21] Appl. No.: 08/976,210

[22] Filed: Nov. 21, 1997

[51] Int. Cl.[7] ............................. G06F 17/30; G06F 7/00
[52] U.S. Cl. ............................................. 707/104; 707/10
[58] Field of Search ..................................... 707/104, 201, 707/202, 10; 395/182.13, 182.14, 182.17; 709/200, 201, 212, 217

[56] References Cited

U.S. PATENT DOCUMENTS

| | | | |
|---|---|---|---|
| 4,814,971 | 3/1989 | Thatte | 364/200 |
| 4,881,166 | 11/1989 | Thompson et al. | 364/200 |
| 5,008,786 | 4/1991 | Thatte | 364/200 |
| 5,123,111 | 6/1992 | Delory et al. | 455/34.1 |
| 5,287,501 | 2/1994 | Lomet | 395/600 |
| 5,537,594 | 7/1996 | Shannon et al. | |
| 5,579,318 | 11/1996 | Reuss et al. | 370/94.2 |
| 5,581,749 | 12/1996 | Hossain et al. | |
| 5,623,532 | 4/1997 | Houde et al. | |
| 5,630,124 | 5/1997 | Coyle, Jr. et al. | 707/103 |
| 5,751,958 | 5/1998 | Zweben et al. | 395/200.34 |
| 5,761,500 | 6/1998 | Gallant et al. | 395/610 |

FOREIGN PATENT DOCUMENTS

| | | |
|---|---|---|
| 0 702 497 | 9/1995 | European Pat. Off. . |
| WO 96/21981 | 7/1996 | WIPO . |
| 97/14237 | 4/1997 | WIPO ........................... H04L 12/24 |
| WO 9736447 | 10/1997 | WIPO . |
| WO 97/41703 | 11/1997 | WIPO . |

OTHER PUBLICATIONS

Han et al, "Implementation and Performance Analysis of Backup System using Concurrent Log Processing in Real-Time DBMS", IEEE Mar. 1997.

Tao et al, "Updates Management in Enterprises Databses", IEEE, Jan. 1997.

PCT International Search Report, Feb. 17, 1999, PCT/SE 98/01964.

*Primary Examiner*—Thomas G. Black
*Assistant Examiner*—Uyen Le
*Attorney, Agent, or Firm*—Jenkens & Gilchrist, P.C.

[57] ABSTRACT

A customer administrative system (user input device) of a wireless communications system is interfaced through a service order gateway with one or more system database network elements to support redundant data back-up and data consistency checks. Logic is included in the service order gateway to process and translate data management orders to effectuate any data updates in each of plural redundantly configured database network elements. The included logic further queries the plural database network elements for stored data, and compares the extracted data to identify inconsistencies.

20 Claims, 3 Drawing Sheets

CUSTOMER ADMINISTRATIVE SYSTEM MANAGEMENT OF REDUNDANT DATABASE NETWORK ELEMENTS IN A TELECOMMUNICATIONS SYSTEM

BACKGROUND OF THE INVENTION

1. Technical Field of the Invention

The present invention relates to telecommunications systems and, in particular, to the management of redundant database network elements using a customer administrative system interface.

2. Description of Related Art

Reference is now made to FIG. 1 wherein there is shown a block diagram of a portion of a telecommunications network 10 including a plurality of database network elements (NE) 12. The telecommunications network 10 comprises a wireless (for example, cellular) communications system, and each database network element 12 comprises a home location register (HLR) database storing permanent and temporary wireless subscriber data. The permanent data stored in the database network element 12 comprises fixed information concerning, for example, the communications service subscripted to by each subscriber. The temporary data stored in the database network element 12 comprises variable information concerning, for example, the current location of each subscriber.

This wireless subscriber data is generally maintained in both a primary database network element 12(p) and a redundant database network element 12(r) The wireless subscriber data is accessed by the network 10 from the primary database network element 12(p) during normal network operation. When necessary, such as when the primary database network element 12(p) fails or communication with the primary database network element 12(p) is not possible, the wireless subscriber data is instead accessed by the network 10 from the redundant database network element 12(r). The redundant database network element 12(r) accordingly functions as a back-up to the primary database network element 12(p).

In accordance with conventional system operation procedures, and through the use of appropriate TIA/EIA Interim Standard IS-41 signaling, the network 10 functions to communicate temporary data not only to the primary database network element 12(p) for storage, but also to the redundant database network element 12(r). Thus, in response, for example, to a registration by a mobile station (not shown) with a switching node of the network 10, location information relating to that registering mobile station is sent from the switching node to the primary database network element 12(p) for storage using known IS-41 signaling messages. This location information is further sent using known IS-41 signaling messages, either directly from the network (i.e., the switching node) or from the primary database network element 12(p), to the redundant database network element 12(r) for back-up storage.

No similar automatic storage procedures are, however, implemented with respect to the permanent data. Thus, at, for example, subscriber definition, the permanent data must be manually entered by the service provider into both the primary database network element 12(p) and the redundant database network element 12 (r). If any modifications subsequently need to be made to that permanent data, these modifications must be manually entered into each database in a similar manner. This prior art procedure is time consuming, inefficient and prone to error. There is a need for an automated procedure for supporting permanent data storage in both the primary database network element 12(p) and the redundant database network element 12(r).

It is important that the wireless subscriber data stored in the primary database network element 12(p) and the redundant database network element 12 (r) be consistent with (for example, identical to) each other. Thus, the primary database network element 12(p) and the redundant database network element 12(r) must, for example, each contain consistent subscriber services data in order to insure that consistent services, such as call forwarding to certain numbers, are provided irrespective of the database network element currently in operation. Conventionally, consistency checks between the data stored in the primary database network element 12(p) and the data stored in the redundant database network element 12(r) have been made on a manual basis. This prior art procedure typically involves outputting and manual comparison of the data from the database network elements. This procedural operation is time consuming, inefficient and prone to error. There is a need for an automated procedure for supporting consistency checks between the data stored in the primary database network element 12(p) and the redundant database network element 12(r).

SUMMARY OF THE INVENTION

A service order gateway between a customer administrative system (user input device) and plural database network elements of a wireless communications system includes logic for supporting the redundant back-up of data in a redundant database network element configuration. The logic functions responsive to a data storage event (for example, a subscription definition) by identifying which ones of the database network elements must be addressed in order to support a redundant storage of the data. The logic then generates individual data storage commands in proper format for each individual database network element. These commands are then issued to each of the database network elements to perform the update. In the event the update cannot be successfully completed by each identified database network element, the logic further issues commands to roll-back the database network elements to a data state prior to the occurrence of the data storage event.

The service order gateway between a customer administrative system (user input device) and plural database network elements of a wireless communications system further includes logic for supporting the performance of a consistency check between the data stored in the plural database network elements. The logic within the service order gateway functions responsive to a consistency check request by identifying which ones of the database network elements must be addressed in order to make the check. The logic then generates individual query requests in proper format for each individual database network element requesting the necessary data. The formatted query requests are then issued to the proper database network elements for processing. Responsive to receipt of the requested data, the logic compares the extracted data to identify any inconsistencies. These noted inconsistencies are reported for proper handling (such as manual correction) or are automatically corrected.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 1:
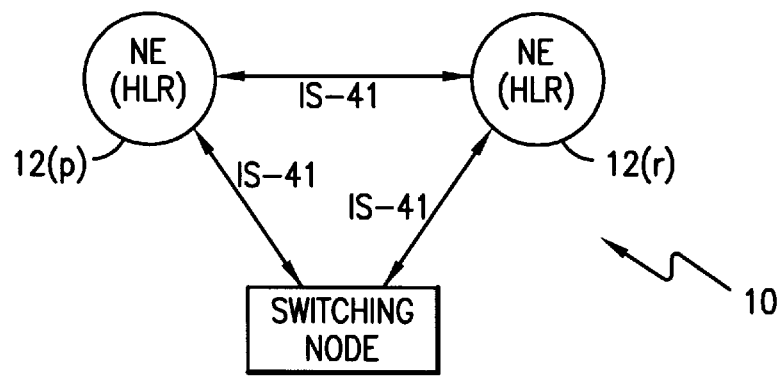
FIG. 1, previously described, is a block diagram of a portion of a telecommunications network implementing a redundant database network element (NE) architecture.
Figure 2:
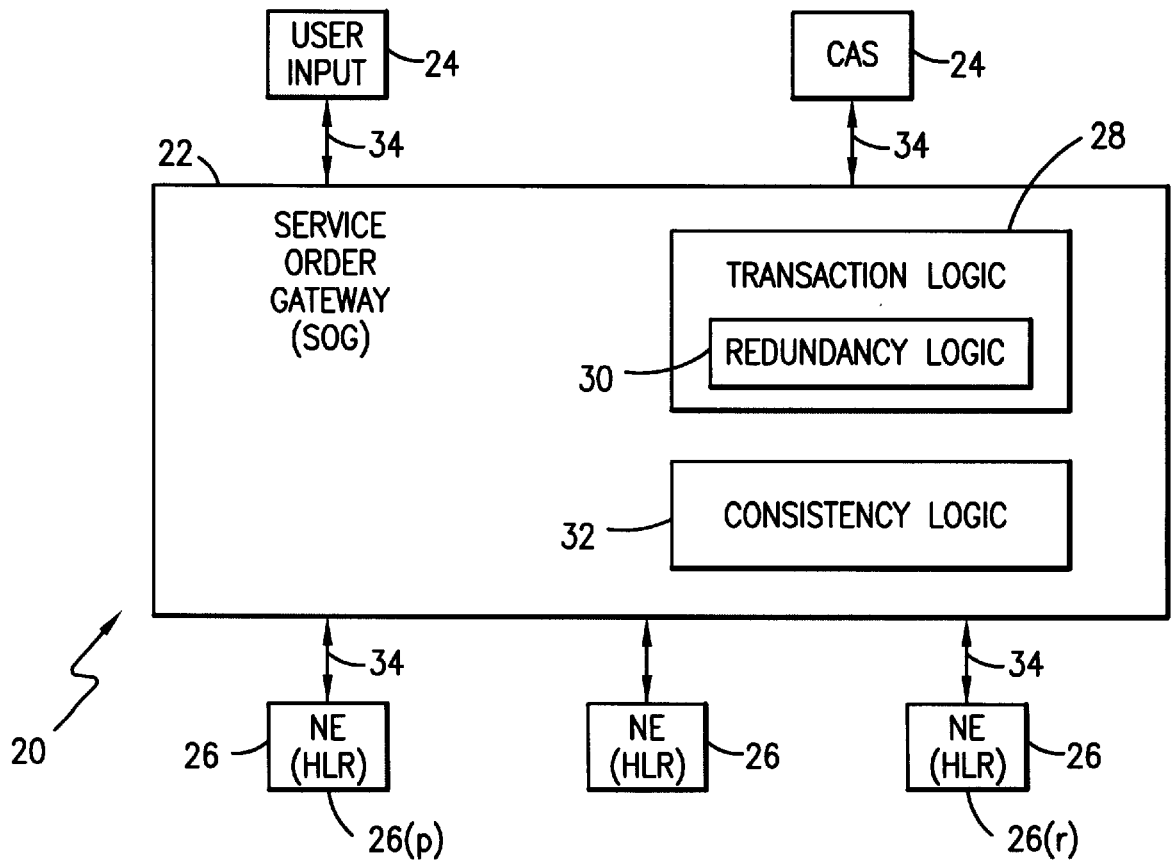
FIG. 2 is a block diagram of a portion of a telecommunications network implementing a present invention service order gateway between a customer administrative system and a plurality of redundant database network elements.

Reference is now made to FIG. 2 wherein there is shown a block diagram of a portion of a telecommunications network 20 implementing a present invention service order gateway (SOG) 22 between a customer administrative system (CAS) or other user input device 24 and a plurality of redundant database network elements (NE) 26. Again, the telecommunications network 20 comprises a wireless (for example, cellular) communications system, and each database network element 26 comprises a home location register (HLR) database storing permanent and temporary wireless subscriber data as previously described. Thus, the database network elements 26 store permanent data comprising subscriber communications service information, and temporary data comprising the current location of each subscriber. The service order gateway 22, customer administrative system or other user input device 24, and database network elements 26 are interconnected using a network 34 preferably comprising a network, such as an X.25 network, separate and apart from the telecommunications network 20.

The customer administrative system or other user input device 24 is utilized to engage in transactions relating to the administration of the permanent data stored in each database network element 26. These administration activities, in general, relate to transactions performed for the purposes of customer (i.e., subscriber) creation or definition, service activation, and the like, relating to a given customer. More particularly, the transactions relate to subscriber data administration tasks such as:

subscription initiation/removal/status, subscriber activation/cancellation, service provision/withdrawal/activation/passivation, C-number (transfer) definition, pass code changes, and serial number changes.

The transactions may further relate to authentication administration tasks such as authentication activation/change/deactivation/status. Additionally, the transactions relate to numbering plan configuration including number range assignment, numbering plan deletion and numbering plan viewing.

The service order gateway 22 supports the customer administrative system or other user input device 24 operations and transactions described above in connection with the administration of the permanent data stored in each database network element 22. For example, customer administration system or other user input device 24 operations and transactions concerning the administration of subscriber data (relating to subscriptions, services and the like), authentication data and numbering plan data are supported by transaction logic 28 of the service order gateway 22. This transaction logic 28 receives orders originated at the customer administrative system or other user input device 24, identifies the particular action(s) to be taken by a database network element 26 in connection with that order, identifies the commands needed to effectuate those actions, converts those commands to a proper format for communication to and/understanding by that database network element, and issues the properly formatted commands to that database network element. The transaction oriented logic 28 further receives any response to the order from the identified database network element 26, converts the response (if necessary) to a proper format for communication to and/understanding by the customer administrative system or other user input device 24 that originated the order, and routes the properly formatted response thereto.

The transaction logic 28 of the service order gateway 22 further supports automated redundancy of customer administration system or other user input device 24 administered subscriber data (relating to subscriptions, services and the like), authentication data and numbering plan data using redundancy logic 30. This redundancy logic 30, operating in conjunction with transaction logic 28, functions to identify for each received order originated at the customer administrative system or other user input device 24 the plural database network elements 26 that are affected by the order (i.e., both the primary and redundant database network elements), identify the particular action(s) to be taken by each database network element in connection with that order, identify the commands needed to effectuate those actions, convert each of those commands to a proper format for communication to and/understanding by the identified database network elements, and issues the commands to each of those database network elements. To support this redundancy operation, the redundancy logic 30 keeps track of the inter-relationships between the plural database network elements 26 concerning administered subscriber data, authentication data and numbering plan data. The redundancy logic 30 accordingly recognizes for each subscriber which of the plural database network elements 26 comprises the primary database network element, and which of the plural database network elements comprises the redundant database network elements. For each order, the appropriate ones of the plural database network elements 26 are identified and issued appropriately formatted commands.

The redundancy logic 30 further supports a roll-back operation in the event a received order cannot be completely redundantly effectuated. For example, responsive to a received order the redundancy logic 30 may recognize the appropriate ones of the plural database network elements 26 to be issued appropriately formatted commands, but only one of those database network elements completes the action(s) needed to be taken in connection with that order. In such a situation, an inconsistency exists between the subscriber data, authentication data and numbering plan data stored in the identified plural database network elements 26. Once this failure to complete the action(s) in each of the plural database network elements 26 is recognized, the redundancy logic 30 causes the data state of the plural database network elements 26 to be rolled-back to their respective states prior to issuance of the commands. This is accomplished by issuing a roll-back command to each of the database network elements 26 which successfully completed the action(s) for that order.

Figure 3A:
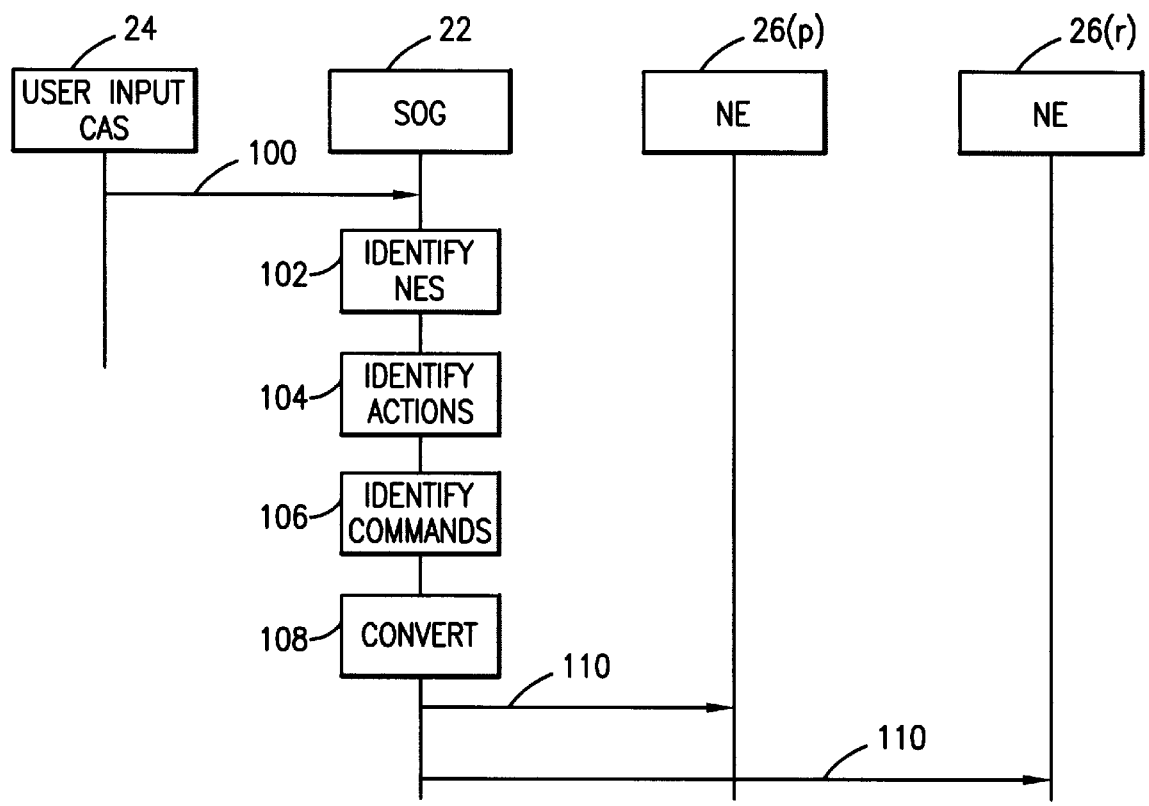
FIGS. 3A–3B are nodal operation and signal flow diagrams illustrating operation of the service order gateway to support redundant data storage.

Reference is now made to FIG. 3A wherein there is shown a nodal operation and signal flow diagram illustrating operation of the interface redundancy logic to implement automated redundancy of subscriber data. The customer administrative system or other user input device 24 originates an order 100 concerning updating of subscriber data, authentication data and/or numbering plan data. This order 100 is received by the service order gateway 22. The service order gateway 22 first processes the order 100 to identify (action 102) each of the plural database network elements 26 that are affected by the order. This would comprise, for example, an identification of both the primary database network element 26(p) and the redundant database network element 26(r). To support this identification process, the redundancy logic 30 keeps track of the inter-relationships between the plural database network elements 26 concerning administered subscriber data, authentication data and numbering plan data. The redundancy logic 30 accordingly recognizes for each subscriber which of the plural database network elements 26 comprises the primary database network element, and which of the plural database network elements comprises the redundant database network element. The service order gateway 22 next identifies (action 104) the particular action(s) to be taken by each database network element 26 in connection with implementing that received order 100. The actions to be taken may comprise, for example, actions to store certain data, modify certain data and/or delete certain data from each of the implicated databases. The service order gateway 22 next identifies (action 106) the commands which are needed to effectuate those actions by each of the database network elements 26. The service order gateway 22 then converts (action 108) each of those commands to a proper format for communication to and/understanding by the identified database network elements. The conversion of action 108 performed by the redundancy logic 30 may comprise a conversion of the originated order 100 or its resulting commands 106 from a given format and protocol (such as a generic, abstract or machine independent language) associated with the customer administrative system or other user input device 24 to a certain format and protocol associated with each individual one of the identified database network elements 26 (such as a machine dependent language). For example, the commands may be made into a man-machine-language (MML) commands compatible with each of the database network elements 26 implicated in the data migration. Alternatively, a translation may be made via a machine-machine-interface (MMI) (such as standard query language—SQL) which is unique to one or more of the database network elements 26. Other translations and conversions may be implemented in accordance with these teachings by persons of ordinary skill in the art. The service order gateway 22 then issues the properly converted commands 110 to each of the primary and redundant database network elements 26(p) and 26(r), respectively.

Figure 3B:
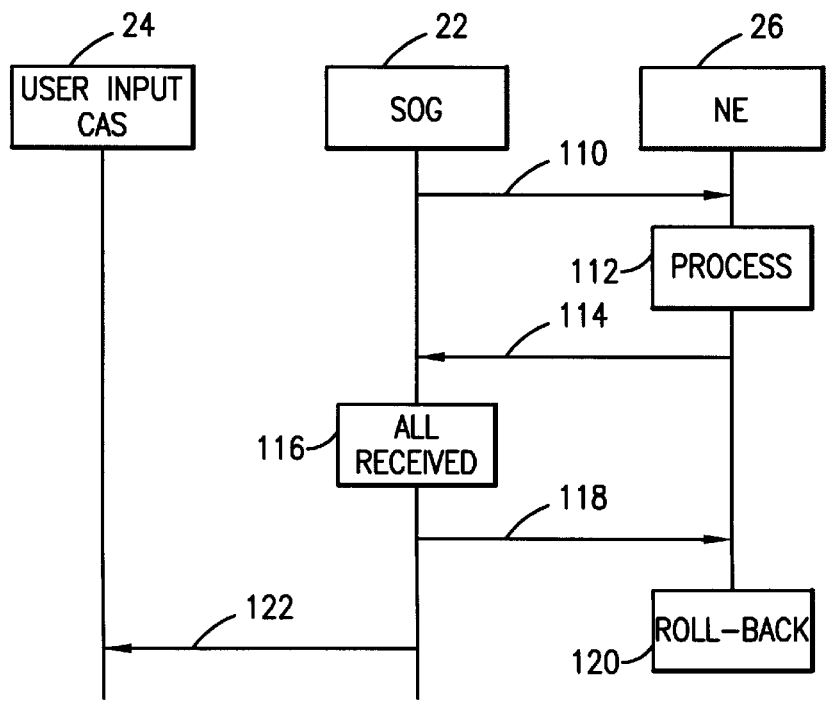

Reference is now made to FIG. 3B wherein there is shown a nodal operation and signal flow diagram illustrating operation of the interface redundancy logic to implement automated roll-back. Once an issued, properly converted command 110 has been received by an identified one of the redundant database network elements 26, that element processes (action 112) the command to effectuate an updating (through, perhaps, data storage, modification, and/or deletion). Once the updating has been completed, the database network element 26 sends a confirmation message 114 back to the service order gateway 22. In the meantime, the service order gateway monitors (action 116) for receipt of the confirmation messages 114 relating to each received order (100, FIG. 3A) to determine whether all confirmations have been received from the identified (102, FIG. 3A) database network elements 26. If yes, the update has been successfully completed. If not all confirmations are received within a certain time period, it is assumed that the update was not completed in each of the identified database network elements 26. In such a situation, an inconsistency exists between the subscriber data, authentication data and numbering plan data stored in the identified plural database network elements 26. A roll-back message 118 is then generated by the service order gateway 22 and sent to each of the database network elements 26 that responded with a confirmation message 114. In response to receipt of the roll-back message 118, the database network element 26 acts to roll-back the update (action 120) to return the database network element to the data state it was in prior to receipt of the properly converted command 110. An update error message 122 is also sent by the service order gateway 22 informing the originating customer administrative system or other user input device 24 that the order 100 concerning updating of subscriber data, authentication data and/or numbering plan data could not be completed.

Reference is now once again made to FIG. 2. The service order gateway 22 further supports a consistency check of the redundantly maintained subscriber data, authentication data and/or numbering plan data stored in the plural database network elements 26 using consistency logic 32. This consistency logic 32 functions to extract certain data from the plural database network elements 26 which meet parameters input through the customer administrative system or other user input device 24, compare the extracted data, and issue a report back to the customer administrative system or other user input device concerning any noted inconsistencies between the extracted data. To support this consistency check, the consistency logic 32 keeps track of the inter-relationships between the plural database network elements 26 concerning administered subscriber data, authentication data and numbering plan data. This aspect of the logic 32 may be shared in common with the similar functionality implemented by the redundancy logic 30 portion of the transaction logic 28. The consistency logic 32 accordingly recognizes for each subscriber which of the plural database network elements 26 comprises the primary database network element, and which of the plural database network elements comprises the redundant database network element. For each instance where a consistency check is ordered, data is extracted from the appropriate ones of the plural database network elements 26. In certain instances, the consistency logic may further initiate an automatic correction of the data stored by one or more of the database network elements 26 to bring the redundantly stored data into agreement.

Figure 4:
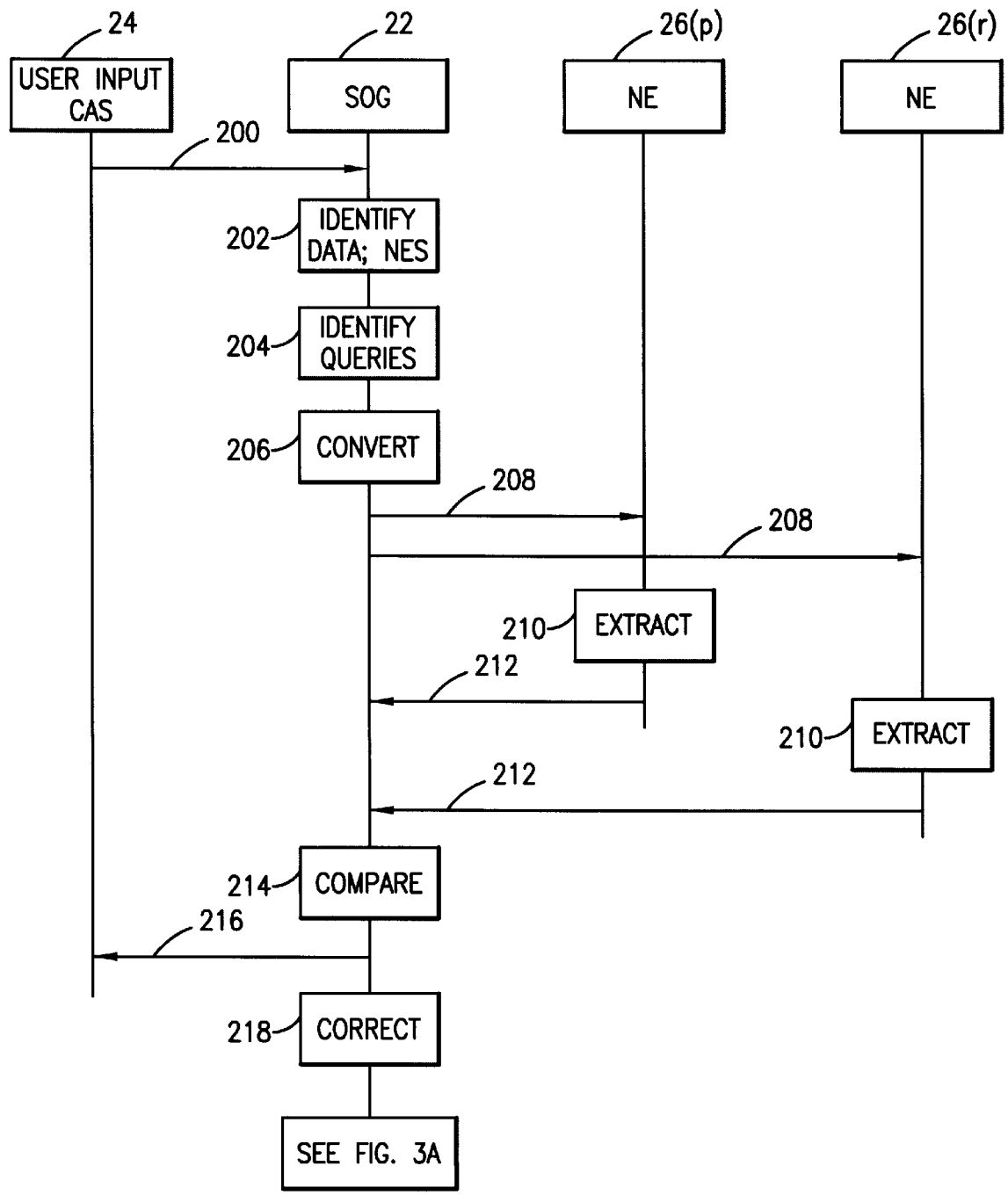
FIG. 4 is a nodal operation and signal flow diagram illustrating operation of the service order gateway to support data consistency checks.

Reference is now made to FIG. 4 wherein there is shown a nodal operation and signal flow diagram illustrating operation of the service order gateway consistency logic to implement a consistency check. The customer administrative system or other user input device 24 originates an order 200 concerning the effectuation of a consistency check of certain data stored in the database network elements 26. The order 200 includes a number of audit parameters concerning the consistency check. These audit parameters may specify the database network elements 26 where the data to be checked may be found, the precise subscriber data, authentication data and/or numbering plan data to be checked, the subscriber whose subscriber data, authentication data and/or numbering plan data is to be checked, and the time frame under which the check is to be performed (for example, one time or periodically). This order 200 is received by the service order gateway 22. The service order gateway 22 first processes the order 200, and in particular its included parameters, to identify (action 202) the data needed to complete the consistency check and the location (i.e., the database network elements 26(p) and 26(r)) where that data may be found. To support this identification process, the consistency logic 32 keeps track of the inter-relationships between the plural database network elements 26 concerning administered subscriber data, authentication data and numbering plan data. This aspect of the logic 32 may be shared in common with the similar functionality implemented by the redundancy logic 30 portion of the transaction logic 28. The consistency logic 32 accordingly recognizes for each subscriber which of the plural database network elements 26 comprises the primary database network element 26(p), and which of the plural database network elements comprises the redundant database network element 26(r). The service order gateway 22 next identifies (action 204) the queries which are needed to obtain the identified data. The service order gateway 22 then converts (action 206) each of those queries to a proper format for communication to and/ understanding by the identified database network elements 26. The conversion of action 206 performed by the consistency logic 32 may comprise a conversion of the queries 204 from a given format and protocol (such as a generic, abstract or machine independent language) to a certain format and protocol associated with each individual one of the identified database network elements 26 (such as a machine dependent language). This aspect of the logic 32 may be shared in common with the similar functionality implemented by the redundancy logic portion 30 of the transaction logic 28. For example, the queries may be made into a man-machine-language (MML) which is unique to one or more of the database network elements 26. Alternatively, a translation may be made via a machine-machine-interface (MMI) (such as standard query language—SQL) which is unique to one or more of the database network elements 26. Other translations and conversions may be implemented in accordance with these teachings by persons of ordinary skill in the art. The service order gateway 22 then issues the properly converted queries 208 to the primary and redundant database network elements 26(p) and 26(r), respectively. Responsive to a received query 208, the database network element 26 extracts (action 210) the requested data and returns 212 the data back to the service order gateway 22. The service order gateway 22 next compares (action 214) the extracted data to identify any noted inconsistencies. These inconsistencies are then reported 216 to the originating customer administrative system or other user input device 24 for appropriate, corrective (if necessary), response. In certain situations, the service order gateway further initiates an automatic correction (action 218) of the inconsistent data. The consistency logic 32 accordingly functions in action 218 to identify the data which is incorrect (and is the source of the noted inconsistency), with an appropriate data updating command 110 (see, FIG. 3A) generated and issued to the primary and/or redundant database network elements 26(p) and/or 26(r), respectively.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A service order gateway node between a data input device and a plurality of database network elements of a wireless communications system each storing subscriber permanent and temporary data, the service order gateway node comprising logic for supporting communications between the data input device and the plurality of database network elements, the service order gateway node's logic functioning to:

receive a request from the data input device to update permanent data that is redundantly stored in certain ones of the plurality of database network elements;

identify the certain ones of the plurality of database network elements that must be redundantly updated in order to respond to the received request;

generate data update messages, wherein each of the generated data update messages is specifically tailored to be understood by one of the identified certain ones of the database network elements; and transmit the generated data update messages from the service order gateway node to contact each of the identified certain ones of the database network elements without passing through another database network element to effectuate redundant permanent data updating in response to the received request.

2. The service order gateway as in claim 1 wherein the data input device comprises a customer administrative system for a telecommunications network.

3. The service order gateway as in claim 2 wherein the database network elements comprise home location registers of the telecommunications network.

4. The service order gateway as in claim 1 wherein the logic further functions to:

receive confirmation from the certain database network elements of an updating of the stored permanent data in response to the received request;

determine whether a confirmation has been received from each of the certain database network elements; and issue a data state roll-back command message to each database network element from which a confirmation was received if the determination is made that a confirmation has not been received from each of the certain database network elements.

5. The service order gateway as in claim 1 wherein the logic function to generate further functions to generate each data update message in a machine dependent language for the identified certain database network elements.

6. A method for interfacing at a service order gateway node a data input device and a plurality of database network elements of a wireless communications system each storing subscriber permanent and temporary data in order to support redundant permanent data updating, comprising the service order gateway node performed steps of:

receiving a request from the data input device to update permanent data that is redundantly stored in certain ones of the plurality of database network elements;

identifying the certain ones of the plurality of database network elements that must be redundantly updated in order to respond to the received request;

generating data update messages, wherein each of the generated data update messages is specifically tailored to be understood by one of the identified certain ones of the database network elements; and transmitting the generated data update messages from the service order gateway node to contact each of the identified certain ones of the database network elements without passing through another database network element to effectuate redundant permanent data updating in response to the received request.

7. The method as in claim 6 wherein the data input device comprises a customer administrative system for a telecommunications network.

8. The method as in claim 7 wherein the database network elements comprise home location registers of the telecommunications network.

9. The method as in claim 6 further including the steps of:

receiving confirmation from the certain database network elements of an updating of the stored permanent data in response to the received request;

determining whether a confirmation has been received from each of the certain database network elements; and issuing a data state roll-back command message to each database network element from which a confirmation was received if the determination is made that a confirmation has not been received from each of the certain database network elements.

10. The method as in claim 6 wherein the step of generating comprises the step of generating each data update message in a machine dependent language for the identified certain database network elements.

11. A service order gateway node between a data input device and a plurality of database network elements of a wireless communications system each storing subscriber permanent and temporary data, the service order gateway node comprising logic for supporting a consistency check between permanent data stored in the plurality of database network elements, the service order gateway node's logic functioning to:

receive a request from the data input device to check the consistency of certain permanent data that is redundantly stored in the plurality of database network elements;

identify certain ones of the plurality of database network elements that contain the certain permanent data identified in the received request;

generate query messages requesting the certain permanent data, wherein each of the generated query messages is specifically tailored to be understood by one of the identified certain ones of the database network elements;

transmit the generated data update messages from the service order gateway node to contact each of the identified certain ones of the database network elements without passing through another database network element to effectuate an extraction of the certain permanent data; and compare the extracted certain permanent data to identify any inconsistencies therebetween.

12. The service order gateway as in claim 11 wherein the data input device comprises a customer administrative system for a telecommunications network.

13. The service order gateway as in claim 12 wherein the database network elements comprise home location registers of the telecommunications network.

14. The service order gateway as in claim 11 wherein the logic further functions to correct identified inconsistencies between the extracted and compared certain permanent data.

15. The service order gateway as in claim 11 wherein the logic function to generate further functions to generate each query message in a machine dependent language for the identified certain database network elements.

16. A method for interfacing at a service order gateway node a data input device and a plurality of database network elements of a wireless communications system each storing subscriber permanent and temporary data in order to support consistency checks between redundantly stored permanent data, comprising the service order gateway node performed steps of:

receiving a request from the data input device to check the consistency of certain permanent data that is redundantly stored in the plurality of database network elements;

identifying certain ones of the plurality of database network elements that contain the certain permanent data identified in the received request;

generating query messages requesting the certain permanent data, wherein each of the generated query messages is specifically tailored to be understood by one of the identified certain ones of the database network elements;

transmit the generated data update messages from the service order gateway node to contact each of the identified certain ones of the database network elements without passing through another database network element to effectuate an extraction of the certain permanent data; and comparing the extracted certain permanent data to identify any inconsistencies therebetween.

17. The method as in claim 16 wherein the data input device comprises a customer administrative system for a telecommunications network.

18. The method as in claim 17 wherein the database network elements comprise home location registers of the telecommunications network.

19. The method as in claim 16 further including the step of correcting identified inconsistencies between the extracted and compared certain permanent data.

20. The method as in claim 16 wherein the step of generating comprises the step of generating each query message in a machine dependent language for the identified certain database network elements.

* * * * *